(12) United States Patent
Wu

(10) Patent No.: US 7,318,531 B2
(45) Date of Patent: Jan. 15, 2008

(54) MOUNTING APPARATUS ASSEMBLY FOR DATA STORAGE DEVICES

(75) Inventor: Pin-Shian Wu, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 483 days.

(21) Appl. No.: 10/948,384

(22) Filed: Sep. 22, 2004

(65) Prior Publication Data

US 2005/0087504 A1    Apr. 28, 2005

(30) Foreign Application Priority Data

Oct. 24, 2003    (TW) .............................. 92218923 U

(51) Int. Cl.
*A47F 29/00*    (2006.01)
(52) U.S. Cl. ...................................................... 211/26
(58) Field of Classification Search .................. 211/26, 211/162, 44.01, 41.12, 186, 189; 361/683, 361/752
See application file for complete search history.

(56) References Cited

U.S. PATENT DOCUMENTS 6,464,085 B1 * 10/2002 Chin et al. .................... 211/26
6,853,549 B2 * 2/2005 Xu ............................. 361/685
6,988,626 B2 * 1/2006 Varghese et al. .............. 211/26

FOREIGN PATENT DOCUMENTS

| TW | 81207129 | 5/1992 |
|----|----------|--------|
| TW | 82207667 | 8/1993 |
| TW | 82202124 | 6/1994 |

\* cited by examiner

*Primary Examiner*—Sarah Purol
(74) *Attorney, Agent, or Firm*—Wei Te Chung

(57) ABSTRACT

A mounting apparatus assembly includes a bracket (30) for accommodating a number of data storage devices (10) with studs (50) secured therein, and a handle (70) pivotally attached to each of the data storage devices via a connecting member (60). The bracket includes a pair of side plate (32a, 32b) each having a channel (35) for slidably receiving the studs. A pair of resilient members (36) is formed at opposite ends of each channel. A retaining protrusion (37) protrudes inwardly from an inner side of a front resilient member of an inner side plate. The data storage devices are secured in the bracket with the studs blocked by the retaining protrusions. In disassembly, move the resilient member with the retaining protrusion outwardly to disengage the studs from the retaining protrusion, and then draw the handle to release the data storage device from the bracket.

12 Claims, 3 Drawing Sheets

MOUNTING APPARATUS ASSEMBLY FOR DATA STORAGE DEVICES

BACKGROUND OF THE INVENTION

1. Field of the Invention

The present invention relates to mounting apparatus assembly, and particularly to a mounting apparatus assembly which readily secures data storage devices in a drive bracket and allows convenient removal of the data storage devices therefrom.

2. Description of the Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. Examples are disclosed in Taiwan Patent Application Nos. 82202124, 81207129 and 82207667. Fixing a data storage device to a drive bracket with bolts is unduly laborious and time-consuming. Furthermore, the computer enclosure needs extra operating space for carrying out the fixing operation. Fixing a data storage device in a drive bracket using rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement.

Thus an improved mounting apparatus assembly which overcomes the above-mentioned problems is desired.

BRIEF SUMMARY OF THE INVENTION

Accordingly, an object of the present of invention is to provide a mounting apparatus assembly which readily and conveniently attaches data storage devices to a bracket and which allows ready detachment them therefrom.

To achieve the above-mentioned object, a mounting apparatus assembly of a preferred embodiment of the present invention comprises a bracket for accommodating a plurality of data storage devices with studs secured therein and a handle pivotally attached to each of the data storage devices via a connecting member. The bracket includes a pair of side plate each having a channel for slidably receiving the studs. A pair of resilient members is formed at opposite ends of each channel. A retaining protrusion protrudes inwardly from an inner side of a front resilient member of an inner side plate. The data storage devices are secured in the bracket with the studs blocked by the retaining protrusions. In disassembly, move the resilient member with the retaining protrusion outwardly to disengage the studs from the retaining protrusion, and then draw the handle to release the data storage device from the bracket.

Other objects, advantages and novel features of the present invention will be drawn from the following detailed description of the preferred embodiments of the present invention with the attached drawings, in which:

DETAILED DESCRIPTION OF THE INVENTION

Figure 1:
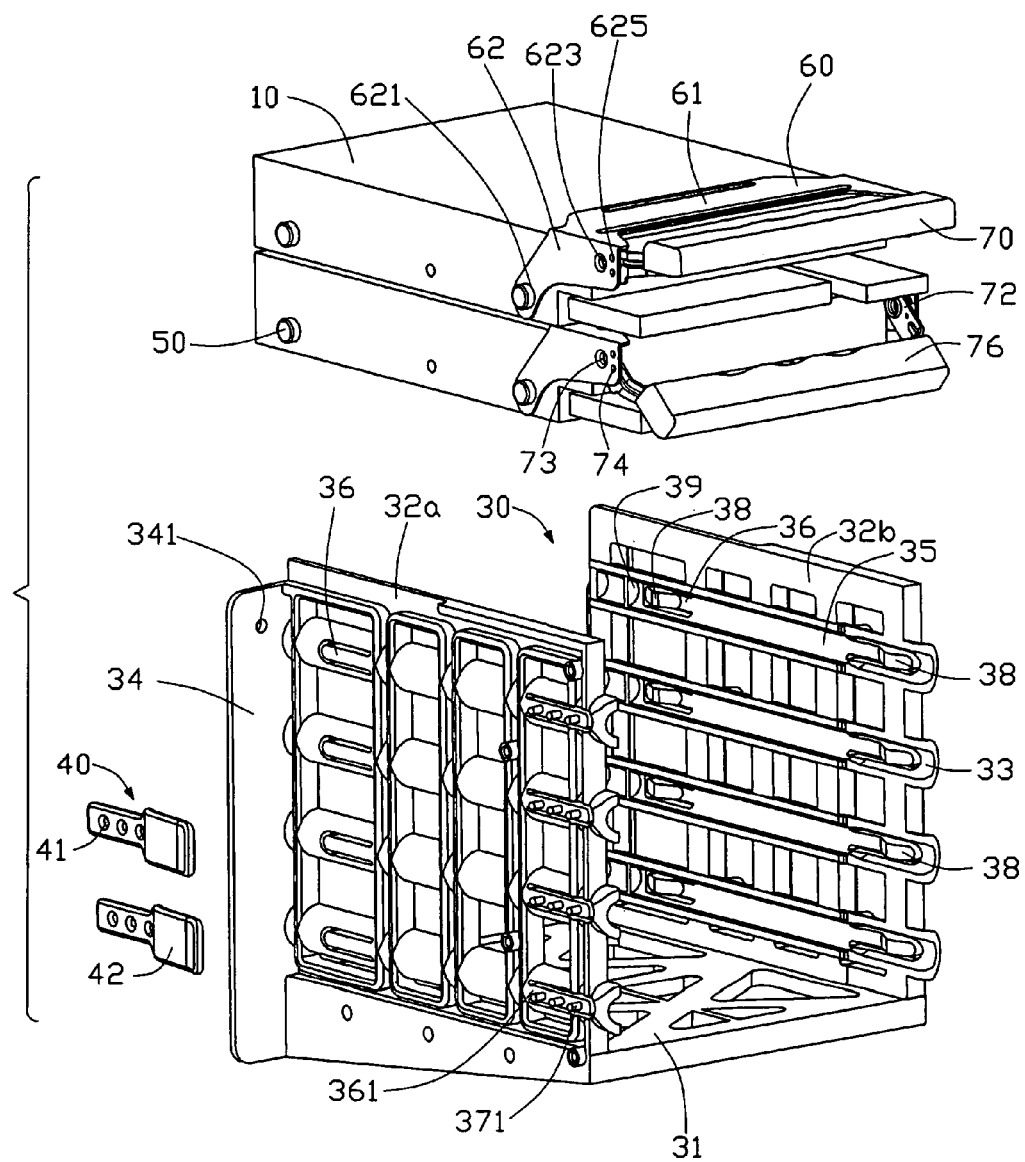
FIG. 1 is an exploded, isometric view of a mounting apparatus assembly in accordance with the preferred embodiment of the present invention, together with a plurality of data storage devices.
Figure 2:
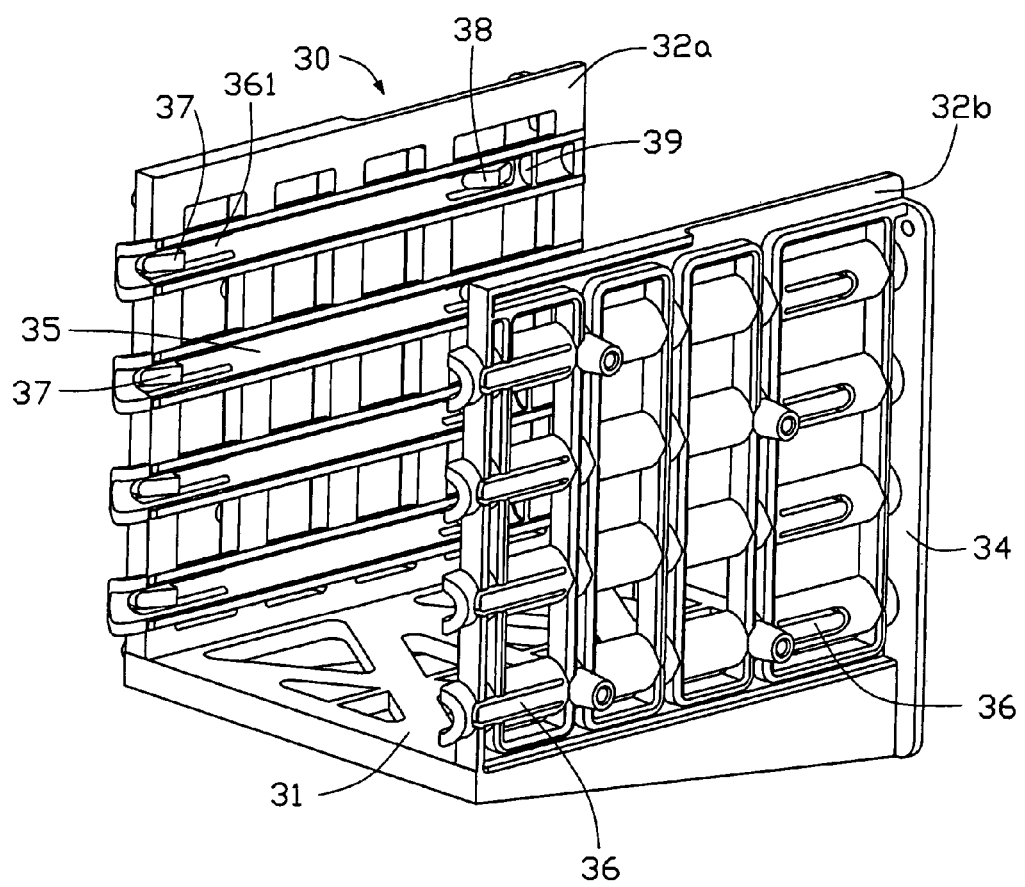
FIG. 2 is an enlarged view of a bracket of FIG. 1, but viewed from another aspect.
Figure 3:
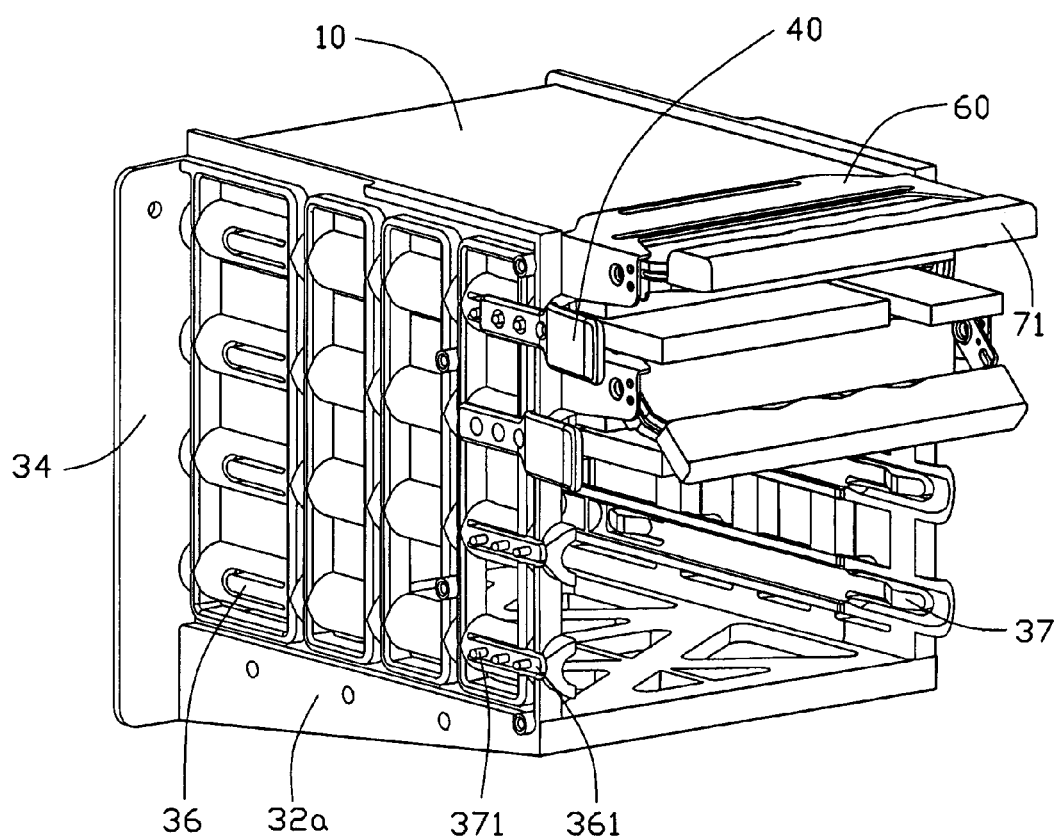
FIG. 3 is an assembled view of FIG. 1.

Referring to FIGS. 1-3, a mounting apparatus assembly in accordance with the preferred embodiment of the present invention for securing data storage devices 10 comprises a bracket 30, and a plurality of handles 70 pivotally attached to the data storage devices 10 via connecting members 60.

The bracket 30 comprises a bottom plate 31, and a pair of side plates 32a, 32b extending upwardly from opposite edges of the bottom plate 31, respectively. Two flanges 34 extend oppositely from rearmost ends of the side plates 32a and 32b, respectively. A plurality of fixing holes 341 is defined in the flanges 33, for attaching the bracket 30 to an electronic device (not shown). A plurality of long sliding channel 35 is symmetrically formed in the side plates 32a and 32b. A pair of cantilever resilient members 36 is symmetrically formed in opposite ends of each channel 35. One of the front resilient members 36 is noted as 361. A wedge-shaped retaining protrusion 37 protrudes inwardly from an inner side of the resilient member 361 at the side plate 32a. The retaining protrusion 37 has a vertical and a slanting stopping surface. A locating protrusion 38 protrudes inwardly from an inner side of each of the other resilient members 36 of the bracket 30. Each the locating protrusion 38 has a pair of slanting surfaces. A plurality of fixing posts 371 extends outwardly from an outer side of the resilient member 361. A guiding recess 33 is formed in a front end of each channel 35. A stop end 39 is formed in a rear end of each channel 35.

An operating member 40 is to be attached to the resilient member 361. A plurality of fixing holes 41 is defined in a rear portion of the operating member 40, for engagingly receiving the fixing posts 371 of the bracket 30. An operating tab 42 is formed in the front of the operating member 40.

Each connecting member 60 comprises a top wall 61 and a pair of sidewalls 62 depending from opposite edges of the top wall 61 respectively. A through hole 621 is defined in a bottom portion of each sidewall 62. A pivoting hole 623 is defined in a top portion of each sidewall 62. A pair of positioning holes 625 is defined adjacent each pivoting hole 623, one above another.

The handle 70 is generally a U-shaped frame. The handle 70 comprises a beam (not shown) and a pair of arms 72 extending from both ends of the beam. A pivoting shaft 73 extends outwardly from each arm 72, for pivotably engaging in the pivoting hole 623 of the connecting member 60. A positioning pin 74 extends outwardly from each arm 72 adjacent the pivoting shaft 73, for engaging in the positioning hole 625 of the connecting member 60 to fix the handle 70 in different positions. A cap 76 is attached to the beam for facilitated griping.

In pre-assembly, a pair of studs 50 extends through the through holes 621 of the connecting member 60 and engages in the front of sidewalls of each storage device 10 thereby attaching the connecting member 60 to the storage device 10. Another pair of studs 50 is secured in the rear of the sidewalls of each storage device 10. The handle 70 is attached to the connecting member 60 with the pivoting shaft 73 pivotally engaging in the through hole 621. The positioning pin 74 engages in an upper positioning hole 625 to keep the handle 70 in a horizontal position, or engages in a lower positioning hole 625 to keep the handle 70 in a slanted portion. The operating member 40 is attached to the resilient member 361, with the fixing posts 371 interferentially engaging in the fixing holes 41.

In assembly, the handle 70 is rotated to the horizontal position and the data storage devices 10 are pushed into the bracket 30 with the studs 50 sliding along the channels 35. When the storage devices 10 reach a predetermined place in the bracket 30, the studs 50 in the rear of the storage device 10 ride over the retaining protrusions 37 and are retained between the locating protrusions 38 and the stop ends 39. At the same time, the studs 50 in the front of the storage device 10 ride over the re are blocked by the retaining protrusions 37 of the bracket 40. The storage device 10 is securely installed in the bracket 30. The handle 70 is rotated downwardly and located in the slanted position, such that the users can conveniently arrange cables attached to the data storage device 10. In addition, the whole assembly occupies less space when the handle locates in the slanted position.

To detach the storage device 10 from the bracket 30, the operating tab 42 of the operating member 40 is drawn outwardly to move the resilient member 361 outwardly so that the retaining protrusion 37 of the disengages from the front studs 50 of the storage device 10. Then the handle 70 is rotated upwardly and located in the horizontal position, the storage device 10 is easily dragged out from the bracket 30.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A mounting apparatus for securing a data storage device having a pair of sides, comprising:
   a connecting member having a pair of sidewalls, and adapted to be attached to the storage device and comprising a pair of pivoting holes defined in the sidewalls;
   a handle comprising a pair of pivoting shafts pivotably engaging in the pivoting holes of the connecting member, wherein the handle is positioned at least two positions relative to the connecting member; and
   a bracket adapted to accommodate the storage device, the bracket comprising a pair of side plates each comprising a pair of side plates each comprising a slide channel, at least one resilient member formed in one of the channels, a retaining protrusion formed inwardly from said resilient member;
   and wherein the data storage device further has two pairs of studs in the sides thereof to be slidably moved into the bracket along the channel, the data storage device is secured in the bracket with the studs blocked by the retaining protrusions, the data storage device is released with the resilient member pushed outwardly to disengage the studs from the retaining protrusion.

2. The mounting apparatus assembly as described in claim 1, wherein the retaining portion has a vertical and a slanting stopping surface.

3. The mounting apparatus assembly as described in claim 1, wherein the sidewalls of the connecting member each define a fixing hole, one pair of the studs extend through the fixing holes to attach the data storage device.

4. The mounting apparatus assembly as described in claim 1, wherein the handle is generally a U-shaped frame and comprises a pair of arms, the pivoting shafts extend from the arms for pivotally engaging with the pivoting holes of the connecting member.

5. The mounting apparatus assembly as described in claim 4, wherein a pair of positioning holes is defined in one of the sidewalls of the connecting member, the arms of the handle comprise a positioning pin for being engagingly received in the positioning holes.

6. The mounting apparatus assembly as described in claim 1, wherein a guiding recess is formed in a front end of each channel.

7. The mounting apparatus assembly as described in claim 1, wherein a stop end is formed in a rear end of each channel.

8. The mounting apparatus assembly as described in claim 1, wherein an operating member is attached to an outer side of said resilient member.

9. The mounting apparatus assembly as described in claim 1, wherein is another pair of resilient members with a locating protrusion is symmetrically formed in opposite ends of each channel.

10. A mounting apparatus assembly comprising:
    a bracket defining a receiving cavity with two sliding channels in sides thereof;
    a plurality of studs secured in sidewalls of the storage device;
    a stopper structure formed on the bracket to limit further forward movement of a data storage device held along said sliding channels when said data storage device is inserted into the receiving cavity from a rear end of the bracket;
    a resilient member located at the rear end with a retaining protrusion thereon to prevent the data storage device from rearward movement once said data storage device is forwardly and fully assembled into the receiving cavity from the rear end; and
    a handle attached to a rear portion of the data storage device for rearwardly withdrawing the data storage device out of the receiving cavity of the bracket wherein the resilient member is outwardly deflected to have the corresponding retaining protrusion disengaged from the data storage device.

11. A mounting apparatus assembly comprising:
    a data storage device having a stud on one exterior wall;
    a bracket defining a receiving cavity with two sliding channels in two sides thereof, each said sliding channel dimensioned to received said stud therein;
    a resilient member located in one end section of one of the sliding channels with retaining protrusion thereon to abut against said stud for preventing the data storage device from backwardly moving opposite to an insertion direction once said data storage device is fully assembled into the receiving cavity along said insertion direction, wherein
    the resilient member is outwardly deflected to have the corresponding retaining protrusion disengaged from the stud so as to allow the data storage device to be withdrawn from the receiving cavity in a direction opposite to that of the insertion direction.

12. The mounting apparatus assembly as described in claim 11, wherein said resilient member extends opposite to the insertion direction.

* * * * *